Oct. 6, 1931.    S. H. CAMPBELL    1,826,051
RETAINING VALVE FASTENING
Filed April 23, 1927
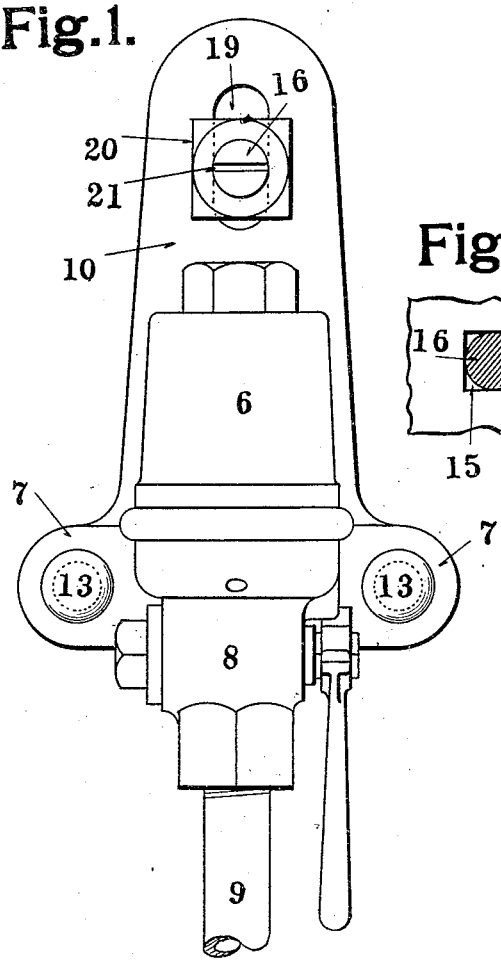
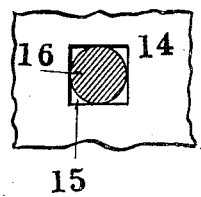
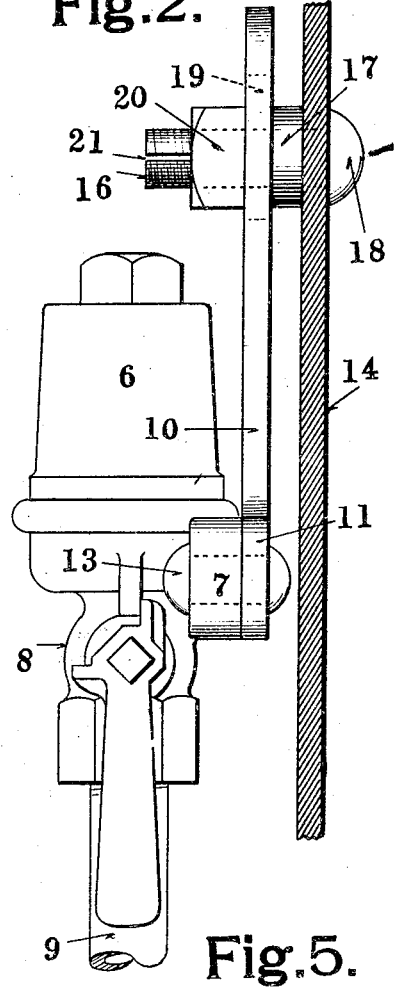
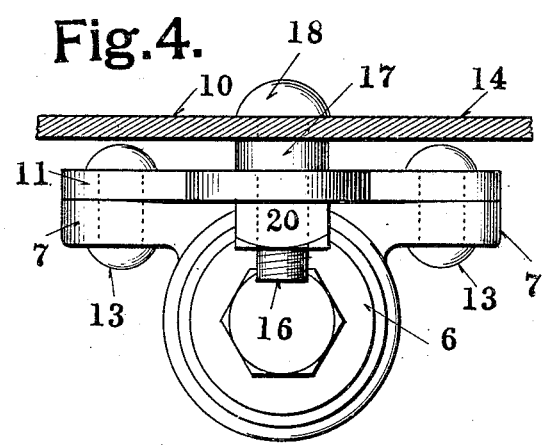
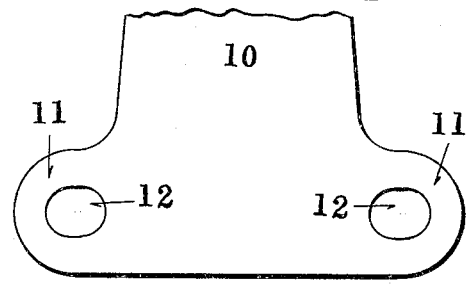
INVENTOR
S. H. CAMPBELL
BY   E. E. Huffman
ATTORNEY Patented Oct. 6, 1931

1,826,051

UNITED STATES PATENT OFFICE

STERLING H. CAMPBELL, OF ST. LOUIS, MISSOURI, ASSIGNOR TO WESTERN RAILWAY EQUIPMENT COMPANY, OF ST. LOUIS, MISSOURI, A CORPORATION OF MISSOURI

RETAINING VALVE FASTENING

Application filed April 23, 1927. Serial No. 186,019.

My invention relates to a retaining valve fastening and has for one of its objects the production of a simple and effective device consisting of the minimum number of parts and one which can be readily applied to the types of valve now in common use.

Another object of my invention is to so construct the device that it will provide a resilient support so as to reduce the liability of injury to the threads of the attached pipe.

In the accompanying drawings, which illustrate one form of retaining valve fastening made in accordance with my invention, Figure 1 is a front elevation; Figure 2 is a side view; Figure 3 is a detail view showing the manner of preventing rotation of the supporting stud; Figure 4 is a top plan view; and Figure 5 is a view of the lower end of the fastening plate.

The valve shown, which is of a usual form, comprises a body 6, a pair of perforated lugs 7 and a lower end 8 having a threaded opening to receive the valve pipe 9. The supporting plate 10 is provided with ears 11 corresponding to the lugs 7 of the valve. Formed in each of the ears 11 is an opening 12 elongated to compensate for the slight difference in distance between the holes in the lugs of different types of valve. The plate 10 is permanently secured to the valve by rivets 13 passing through the openings in the lugs 7 and ears 11 and projects a substantial distance above the body of the valve so as to give free access to attaching stud hereinafter to be described.

Formed in the end wall 14 of the car is a square, or other non-circular opening 15 through which passes the short inner end of a stud 16. This stud 16 is provided with a collar 17 bearing against the wall 14. The inner end of the stud is riveted over to form a head 18 between which and the collar the wall is clamped. This riveting operation also forces the metal of the stud into the corners of the opening 15 so that the stud is not only permanently secured to the car but is also effectively locked against rotation. Located in the plate 10 above the body of the valve is a central vertical slot 19 through which the long end of the stud extends. This long end of the stud is threaded and is engaged by a nut 20 by means of which the plate is clamped in position. The end of the bolt is preferably split at 21 so that it may be spread to form a nut lock. The use of the slot 19 provides the necessary vertical adjustment for the valve; moreover, its location not only gives ready access to the nut 20 but the plate extending between the stud and rivets 13 provides a springy or flexible support to cushion jars communicated through the pipe 9 and consequent injury to the threaded connection between the pipe and the valve.

Having fully described my invention, what I claim as new and desire to secure by Letters Patent of the United States is:

1. In a device of the class described, the combination with a retaining valve, of a plate permanently secured thereto and having a central part projecting above the body of the valve, said central part being provided with a vertical slot, and means adapted to be carried by a car and engaging said slot to adjustably secure the valve in position on the car.

2. In a device of the class described, the combination with a type retaining valve having attaching lugs provided with holes, of a plate permanently secured to said valve and projecting above the body thereof, said plate being provided with a medially located slot formed in the part projecting above the valve, a stud adapted to be carried by a car and engaging said slot, said stud being of greater diameter than the lug holes, and a collar surrounding said stud between the plate and car to space the former from the latter.

In testimony whereof, I hereunto affix my signature, this 21st day of April, 1927.

STERLING H. CAMPBELL.

CERTIFICATE OF CORRECTION.

Patent No. 1,826,051.                                Granted October 6, 1931, to

STERLING H. CAMPBELL.

It is hereby certified that error appears in the printed specification of the above numbered patent requiring correction as follows: In claim 2, line 78, strike out the word "type"; and that the said Letters Patent should be read with this correction therein that the same may conform to the record of the case in the Patent Office.

Signed and sealed this 17th day of November, A. D. 1931.

(Seal)

M. J. Moore,
Acting Commissioner of Patents.